No. 834,735. PATENTED OCT. 30, 1906.
H. V. JÖRGENSEN & C. H. SÖRENSEN
CIRCULATION DEVICE FOR HOT WATER HEATING PLANTS.
APPLICATION FILED MAR. 22, 1905.
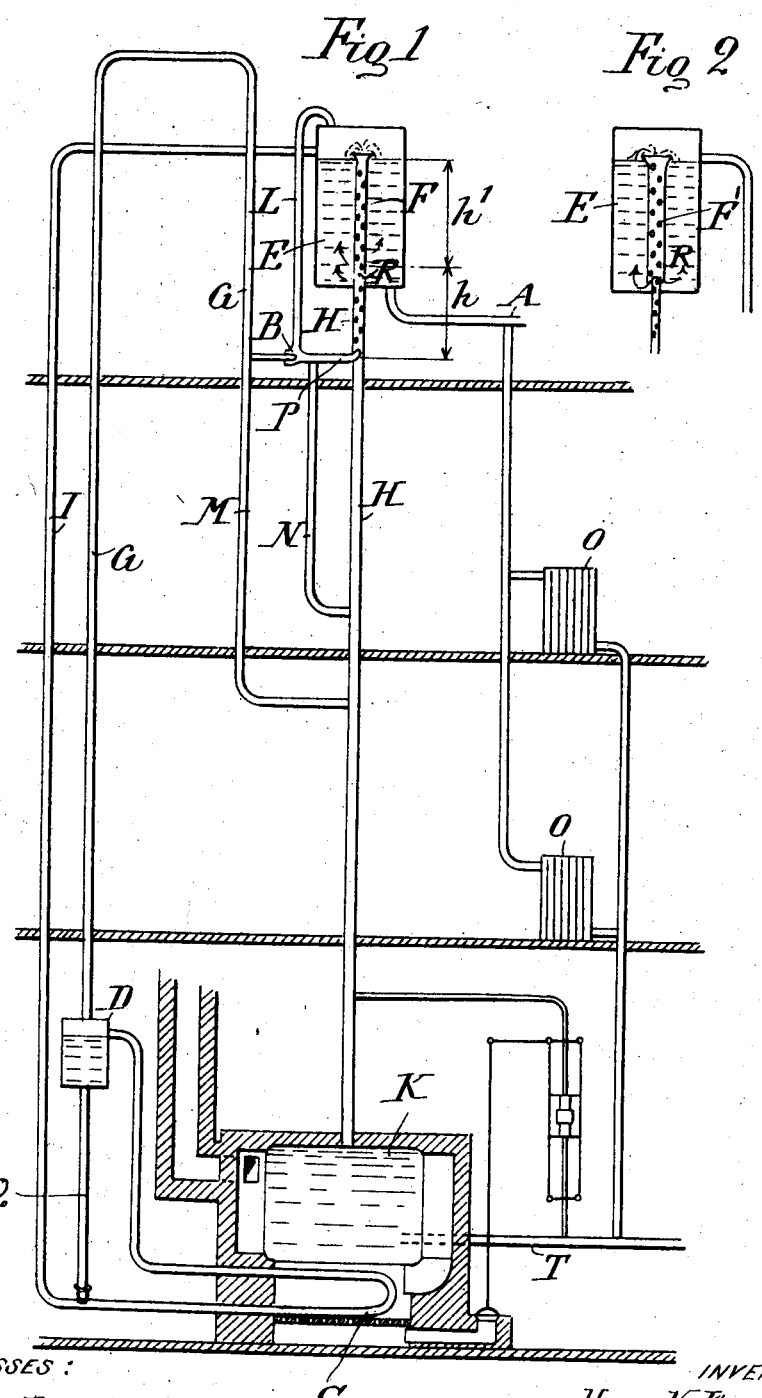
WITNESSES:
W. M. Avery
O. E. Fay.
INVENTORS
Hans V. Jörgensen
Carl H. Sörensen
BY
ATTORNEYS

UNITED STATES PATENT OFFICE.

HANS V. JÖRGENSEN AND CARL H. SÖRENSEN, OF AARHUS, DENMARK.

CIRCULATION DEVICE FOR HOT-WATER HEATING PLANTS.

No. 834,735.　　　　　Specification of Letters Patent.　　　　　Patented Oct. 30, 1906.

Application filed March 22, 1905. Serial No. 251,401.

*To all whom it may concern:*

Be it known that we, HANS VALDEMAR JÖRGENSEN, engineer, and CARL HEDEVIGGO SÖRENSEN, manufacturer, citizens of the Kingdom of Denmark, and residents of Aarhus, Lille Torv 2, Denmark, have invented new and useful Improvements in Circulation Devices for Hot-Water Heating Plants, of which the following is a specification.

Hot-water heating plants in which air is blown into a main rising-pipe in order to increase the circulation of water in the pipe system are well known. The object of the existing patents in this line is to produce a circulation as powerful as possible in proportion to the energy expended and in such a manner that the system does not lose heat and so that the use of air does not cause special difficulty.

Reference is to be had to the accompanying drawings, forming a part of this specification, in which similar characters of reference indicate corresponding parts in both the figures.

Figure 1 is a diagrammatic view of a heating plant, showing the principle of our invention, and Fig. 2 is a fragmentary view of a modification of the same.

Fig. 1 shows the boiler K, in which the water is heated and from where it rises to the tank E through the main pipe H. B is a steam-injector, which by means of steam from the chamber D of a steam-generator draws air from the tank E and blows it into the rising-pipe H. The water circulates from the boiler K through the main riser H, pipe A, the radiators O, pipe T, and back to the boiler K. The air circulates from the tank E, pipe L to steam-injector B, pipe P, and main riser H back to tank E. The tank E has an overflow-pipe I, which leads water to the heating-coil C of the generator, the coil being connected to the chamber D by a pipe Q. The generator supplies the injector B through pipe G.

The necessary circulation of the water is effected because the mixture of air and water in the main rising-pipe is of a lower specific gravity than that of the air-free water in the other pipes. The mixture of air and water will rise with a force exactly equal to the diminution of the weight of the water column over pipe P, which diminution is produced by the addition of the air. If, for instance, in a certain moment the pipe H contains $a$ volume per cent. of air, the mixture of air and water will have a specific gravity of approximately $\frac{100-a}{100}$ showing that the mixture is $a$ per cent. lighter than water alone, as the weight of the air is insignificant. This shows that the circulation-pressure increases with the length of the pipe through which the air is passing, and it is consequently advantageous to extend the main pipe H to the surface of the water in the tank E. This, however, cannot be done, because the height of water in the tank E is subject to changes, owing to the failure of the water to overflow the upper end of said pipe due to the contraction of the cooled water. A low height of water in tank E would cause an interruption in the flow of water.

The main pipe H in Fig. 1 is consequently provided with an extension F, carried up to the highest possible water-level in tank E, (the bottom of overflow-pipe I,) and extension F is perforated at the bottom of tank E, so as to allow the water at a lower water-level in E to flow through these holes R from F to E and from these to the radiators.

When air is blown into H, the air will force some water out through the holes R, and itself, with the rest of the water, will flow out through pipe F above the water-level in E. By this a quicker circulation is effected, and it, moreover, prevents air-bubbles from being carried with the water through pipe A to the radiators, which would create a counter-pressure and lower the water's speed of circulation.

Fig. 2 shows a modification in which the extension F' of the riser is of a larger diameter than H and is placed around this and without fitting tightly to H and the bottom of tank E.

In the pipe P, through which the air is led into the main riser H, a little water will always collect, owing to the air being saturated with moisture by passing the hot water in riser H and tank E. This precipitation of water checks the injection of air, renders this more irregular, and influences by this the circulation of the water. If steam is used for injection of air, as is shown in Fig. 1, the air becomes still more intermixed with condensed steam, and draining of steam-pipe G becomes necessary. Fig. 1 shows two drains M and N, both of them leading to the main rising-pipe.

What we claim, and desire to secure by Letters Patent, is—

1. In a hot-water heating system, the combination of a main rising-pipe, a tank at its upper end into which it discharges, a pipe leading from the upper part of the tank, an injector connected with the last-named pipe and with the main rising-pipe for forcing air into the latter, a steam-pipe connected with said injector, and a pair of drains leading respectively from the steam-pipe and air-pipe and both discharging into the main rising-pipe.

2. In a hot-water heating system, the combination of a tank, a main pipe entering the lower end of the tank and extending to a point near the top thereof and provided with perforations within the tank, a pipe leading from the upper part of the tank, an injector connected with the latter pipe for forcing air from the same into the main pipe, and a supply-tank located at the bottom of the main pipe.

3. A hot-water heating system comprising a tank, a main pipe entering the bottom of the tank and extending to a point near the top thereof and provided with perforations throughout its length within the tank and, means for forcing air into said pipe below the bottom of the tank.

4. In a heating system, the combination of a main rising-pipe, a tank into which it discharges, an air-pipe, an injector connected with the air-pipe and with the main rising-pipe for forcing air into the latter, a steam-pipe connected with said injector, and drains leading from the steam-pipe and air-pipe and discharging into the main rising-pipe.

5. In a heating plant, the combination of a tank, a main rising-pipe discharging into the tank, an air-pipe communicating with the top of the tank, an injector for forcing air from said pipe into the main rising-pipe below the tank, a drain-pipe from said air-pipe, a steam-pipe leading into the said injector, a drain-pipe from the steam-pipe, both of said drain-pipes discharging into the main rising-pipe below the injector, whereby the air from the tank is circulated back into the tank.

Signed by us at Copenhagen, Denmark, this 24th day of February, 1905.

H. V. JÖRGENSEN.
CARL. H. SÖRENSEN.

Witnesses:
CHARLES HUDE,
OSCAR WELTS.